(12) United States Patent
Tsukuda

(10) Patent No.: US 6,735,428 B1
(45) Date of Patent: May 11, 2004

(54) WIRELESS COMMUNICATION APPARATUS

(75) Inventor: Naoki Tsukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 402 days.

(21) Appl. No.: 09/613,450

(22) Filed: Jul. 10, 2000

(30) Foreign Application Priority Data

Jul. 9, 1999 (JP) .......................................... 11-195861

(51) Int. Cl.⁷ ................................................ H04B 1/10
(52) U.S. Cl. ........................ 455/296; 329/358; 331/1 R; 455/141; 455/164.1
(58) Field of Search .............................. 455/141, 164.1, 455/186.1, 296, 255, 256, 257, 258, 259, 260; 713/503; 329/358, 359, 360; 331/74, 34, 1 R; 375/355, 376

(56) References Cited

U.S. PATENT DOCUMENTS

| | | | | |
|---|---|---|---|---|
| 4,247,952 A | * | 1/1981 | Shibuya | 455/186.1 |
| 5,568,098 A | * | 10/1996 | Horie et al. | 331/16 |
| 5,610,559 A | * | 3/1997 | Dent | 331/2 |
| 5,732,340 A | * | 3/1998 | Nishino | 455/212 |

FOREIGN PATENT DOCUMENTS

| | | |
|---|---|---|
| JP | S63-046829 | 2/1988 |
| JP | H03-101317 | 4/1991 |
| JP | 5-152903 | 6/1993 |
| JP | H07-202737 | 4/1995 |
| JP | 9-8688 | 1/1997 |
| JP | 2000-068872 | 3/2000 |
| JP | 2000-341165 | 8/2000 |

OTHER PUBLICATIONS

Foreign Office Action from the Japanese Patent Office dated Sep. 17, 2002.

* cited by examiner

Primary Examiner—Charles Appiah
Assistant Examiner—Nghi H. Ly
(74) Attorney, Agent, or Firm—Sughrue Mion, PLLC

(57) ABSTRACT

A wireless communication apparatus prevents desensitization in a line signal frequency caused by clock signal harmonic. The wireless communication apparatus is provided with a receiver/demodulator for receiving a line signal of a predetermined frequency and for demodulating the line signal, a control section decoding the demodulated line signal using an operation clock signal, and a clock signal generating circuit supplying a clock signal. The control section controls the clock signal generating circuit to change a frequency of the clock signal in response to the line signal frequency, therefore, harmonic of the clock signal do not enter into a desensitization range corresponding to the line signal frequency.

9 Claims, 5 Drawing Sheets

WIRELESS COMMUNICATION APPARATUS

BACKGROUND OF THE INVENTION

1. Field of the Invention

The present invention relates to a wireless communication apparatus generating a decoding clock signal using a frequency synthesizer and more particularly relates to the wireless communication apparatus capable of preventing desensitization caused by harmonic of an operation clock signal.

2. Description of the Related Art

Concerning a receiving part in a wireless communication apparatus, when a strong disturbance wave exists near a receiving frequency, desensitization occurs because of amplification degeneration from saturation of a high frequency part or a like, and therefore a receiving sensitivity deteriorates.

Particularly, concerning a wireless selective calling receiver (such as a pager), for example, the wireless communication apparatus having multiple receiving line signal frequencies, since clock signal harmonic generated in a clock signal generating circuit in the wireless selective calling receiver becomes an disturbance wave and desensitization occurs, there are cases in that receiving sensitivity deteriorates as to a part of line signal frequencies.

FIG. 6 is a block diagram showing a conventional wireless communication apparatus, and FIG. 7 is a view showing a relationship between a line signal frequency and a clock signal harmonic frequency in the conventional wireless communication apparatus.

The conventional wireless communication apparatus, as shown in FIG. 6, is provided with a clock signal generating circuit 301, a control section 302, a receiver/demodulator 303, and a nonvolatile memory 304.

The clock signal generating circuit 301 supplies an operating clock for the control section 302.

The control section 302 controls a receiving operation of the receiver/demodulator 303 and executes processes such as decoding for a digital coded signal as a demodulation result from the receiver/demodulator 303.

The receiver/demodulator 303 demodulates received wireless signal and outputs a demodulated signal consisting of a digital coded signal.

The nonvolatile memory 304 memorizes data such as an ID address in the demodulated signal, a receiving line signal frequency in the receiver/demodulator 303 and a like.

Additionally, for example, a frequency synthesizer is used as the clock signal generating circuit 301. In the conventional wireless communication apparatus having multiple receiving line signal frequencies, like a wireless selective calling receiver, in order to convert a frequency of a received signal or a like, it is conventionally used that plural signals having required various frequencies are produced from stable standard frequency signals using a frequency synthesizer when plural station-frequency-signals and a like are generated (refer to Japanese Patent Application Laid-Open No. Hei5-152903, Japanese Patent Application Laid-Open No. Hei9-008688).

Further, recently, a frequency synthesizer is also used as a clock signal generating circuit for generating a clock signal decoding an encoded-received-demodulated signal.

Next, explanations will be given of operation of the conventional wireless communication apparatus with reference to FIG. 6.

A high frequency signal inputted through an antenna (not shown) and consisting of a wave modulated by a predetermined modulation mode is inputted into the receiver/demodulator 303.

The control section 302 controls the receiver/demodulator 303 so that only the high frequency signal of a required line signal frequency in response to data of received line signal frequency memorized in the nonvolatile memory 304.

The receiver/demodulator 303 demodulates the received high frequency signal and then outputs the demodulated signal as a digital signal of a predetermined encoding form.

The control section 302 decodes this encoded signal using an operation clock signal from the clock signal generating circuit 301. In addition, the control section 302 outputs decoded result data onto a display or a like when an ID address in decoded results data coincides with the ID address memorized in the nonvolatile memory 304.

Concerning the wireless communication apparatus shown in FIG. 6, as shown in FIG. 7, a constant range P of front and back of a line signal frequency $f_0$, for example, a range of $f_0 \pm \Delta f_0$ is the range in which desensitization occurs. When a disturbance wave exists in this range, receiving sensitivity deteriorates.

When a harmonic frequency $m \cdot f_{LKC}$ of a clock signal is within this range, it effects to a received input and becomes the disturbance wave, receiving sensitivity deteriorates compared with a frequency range outside this range.

In the conventional wireless communication apparatus shown in FIG. 6, the frequency $f_{CLK}$ of a clock signal generated in the clock signal generating circuit 301 is approximately constant. Therefore, there is a problem in that receiving sensitivity deterioration can not avoided since a harmonic $m \cdot f_{CLK}$ of the clock signal enters the frequency range of $f_0 \pm \Delta f_0$ in which desensitization occurs with a used line signal frequency when a number of receiving lines is large.

SUMMARY OF THE INVENTION

In view of the above, it is an object of the present invention to provide a wireless communication apparatus having plural receiving line signal frequencies and preventing desensitization caused by harmonic of an operation clock signal.

According to a first aspect of the present invention, there is provided a wireless communication apparatus including a receiver/demodulator for receiving a line signal of a designated frequency and for demodulating the line signal, a control section for decoding a demodulated line signal with a clock signal, and a clock signal generating circuit for supplying the clock signal for the control section, and wherein the control section controls the clock signal generating circuit in response to the line signal frequency to change a frequency of the clock signal so that harmonic of the clock signal does not exist in a desensitization range corresponding to the line signal frequency.

In the foregoing, a preferable mode is one wherein the clock signal generating circuit includes a standard oscillator generating a signal of a standard frequency, a divider for dividing the clock signal, a phase comparator for detecting a phase error between the divided clock signal and a standard frequency signal and a VCO (Voltage Controlled Oscillator) for changing an oscillating frequency in response to the phase error and wherein the frequency of the clock signal outputted from the VCO is changed by changing the dividing number of the divider in accordance with control by the control section.

Also, a preferable mode is one wherein the control section sequentially changes the dividing number of the divider and controls the clock signal generating circuit to generate the clock signal while determining whether a clock signal harmonic frequency exists in the desensitization range corresponding to the line signal frequency in accordance with the line signal frequency or not, so that the clock signal harmonic frequency does not exist in the desensitization range corresponding to the line signal frequency.

Also, a preferable mode is one wherein the control section determines whether the clock signal harmonic frequency is close to an upside or a downside in the desensitization range, and then controls the clock signal harmonic frequency to exist just outside of the desensitization range.

Also, a preferable mode is one wherein the control section calculates a dividing number of dividing part necessary so that the clock signal harmonic frequency does not exist in the desensitization range corresponding to the line signal frequency in response to the line signal frequency.

Also, a preferable mode is one further including a memory for memorizing the calculated dividing number so as to correspond with the line signal frequency, and wherein the control section controls the clock signal generating circuit to generate the clock signal using the memorized dividing number when identical line signal frequency is received.

Also, a preferable mode is one further including a memory for previously memorizing dividing-rate-data of the divider for each division among plural divisions obtained by dividing a receiving-frequency-range, the dividing-rate-data determined so that a clock signal harmonic frequency does not exist in a desensitization range corresponding to all line signal frequencies in each division, and wherein the control section reads the dividing-rate-data corresponding to a received-line-signal-frequency, controls a dividing-rate of the divider in accordance with the dividing-rate-data and controls the clock generating circuit to generate the clock signal.

According to a second aspect of the present invention, there is provided a wireless communication method including a step of receiving a line signal of a designated frequency, a step of demodulating the line signal, a step of changing a frequency of a clock signal in response to a line signal frequency so that harmonic of the clock signal does not exist in a desensitization range corresponding to the line signal frequency, a step of generating the clock signal, and a step of decoding the demodulated line signal with the clock signal.

According to a third aspect of the present invention, there is provided a media storing a program, the program including a step of receiving a line signal of a designated frequency, a step of demodulating the line signal, a step of changing a frequency of a clock signal in response to a line signal frequency so that harmonic of the clock signal does not exist in a desensitization range corresponding to the line signal frequency, a step of generating the clock signal, and a step of decoding the demodulated line signal with the clock signal.

With this configuration, in the wireless communication apparatus, the control section controls a clock signal generating part to change frequency of the clock signal in accordance with the line signal frequency, therefore, harmonic of a clock signal do not enter the desensitization range corresponding to the line signal frequency.

In this case, the clock signal frequency may be controlled in a frequency synthesizer by changing a dividing number of a dividing part so as to change the frequency of the clock signal outputted from the VCO in accordance with control of the control section. This frequency synthesizer includes the standard oscillator generating a standard frequency signal, the dividing part dividing a clock signal, a phase comparison part for detecting a phase error between the divided signal and the standard frequency signal and the VCO changing an oscillating frequency in response to the phase error.

Also, in this case, the control section may sequentially change the dividing number of the dividing part and may control the clock signal generating circuit to generate the clock signal while determining whether a clock signal harmonic frequency exists in the desensitization range corresponding to the line signal frequency or not in accordance with the line signal frequency, so that the clock signal harmonic frequency does not exist in the desensitization range corresponding to the line signal frequency.

Also, a memory part may be provided to previously memorize dividing-rate-data of the dividing part for each division among plural divisions obtained by dividing a receiving-frequency range, the dividing-rate-data determined so that a clock signal harmonic frequency does not exist in a desensitization range corresponding to all line signal frequencies in each division, and the control section may read the dividing-rate-data corresponding to a received-line-signal-frequency, may control a dividing-rate of the dividing part in accordance with the dividing-rate-data and may control the clock generating part to generate the clock signal.

Accordingly, with this configuration, the clock signal frequency is controlled in the clock generating part so that a harmonic frequency of an operation clock signal in the control section does not become close to the line signal frequency and does not enter a frequency range in which desensitization occurs in the receiver/demodulator, therefore, it is possible to prevent receiving-desensitization by influence of clock signal harmonics.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes for carrying out the present invention will be described in further detail using various embodiments with reference to the accompanying drawings.

First Embodiment

Figure 1:
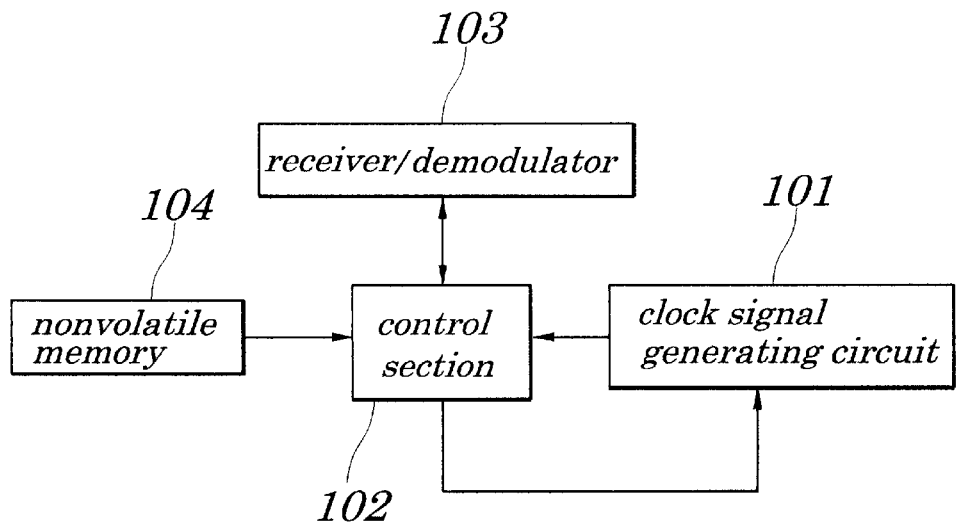
FIG. 1 is a block diagram showing a wireless communication apparatus according to a first embodiment of this invention.
Figure 2:
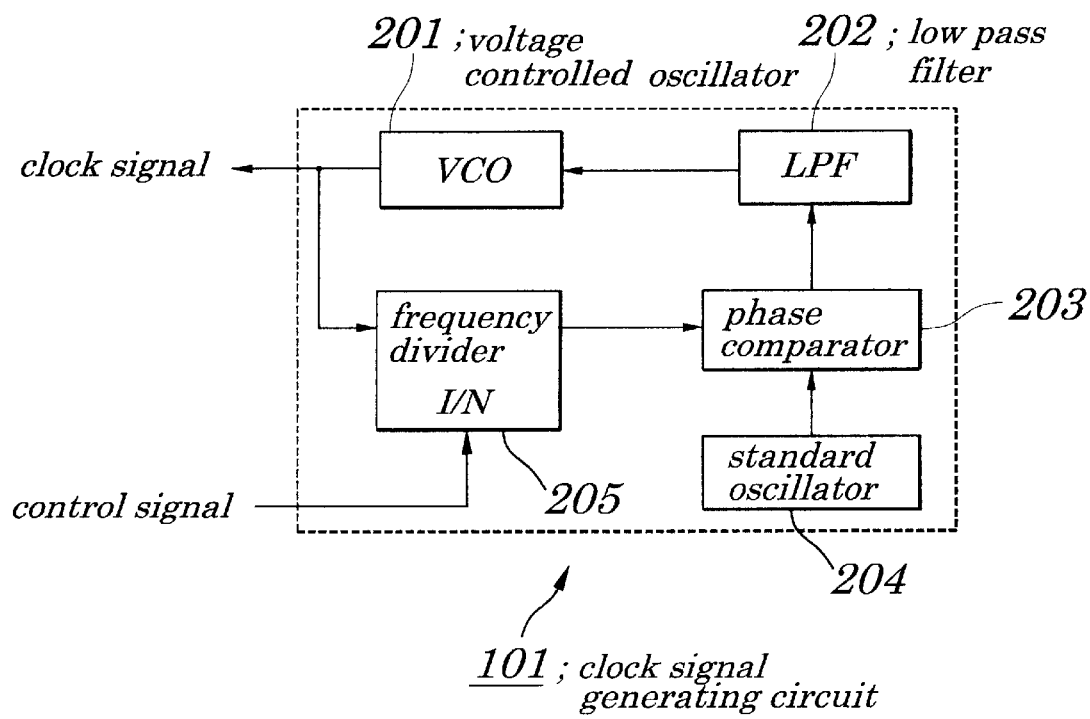
FIG. 2 is a block diagram showing a clock signal generating circuit in the first embodiment.
Figure 3:
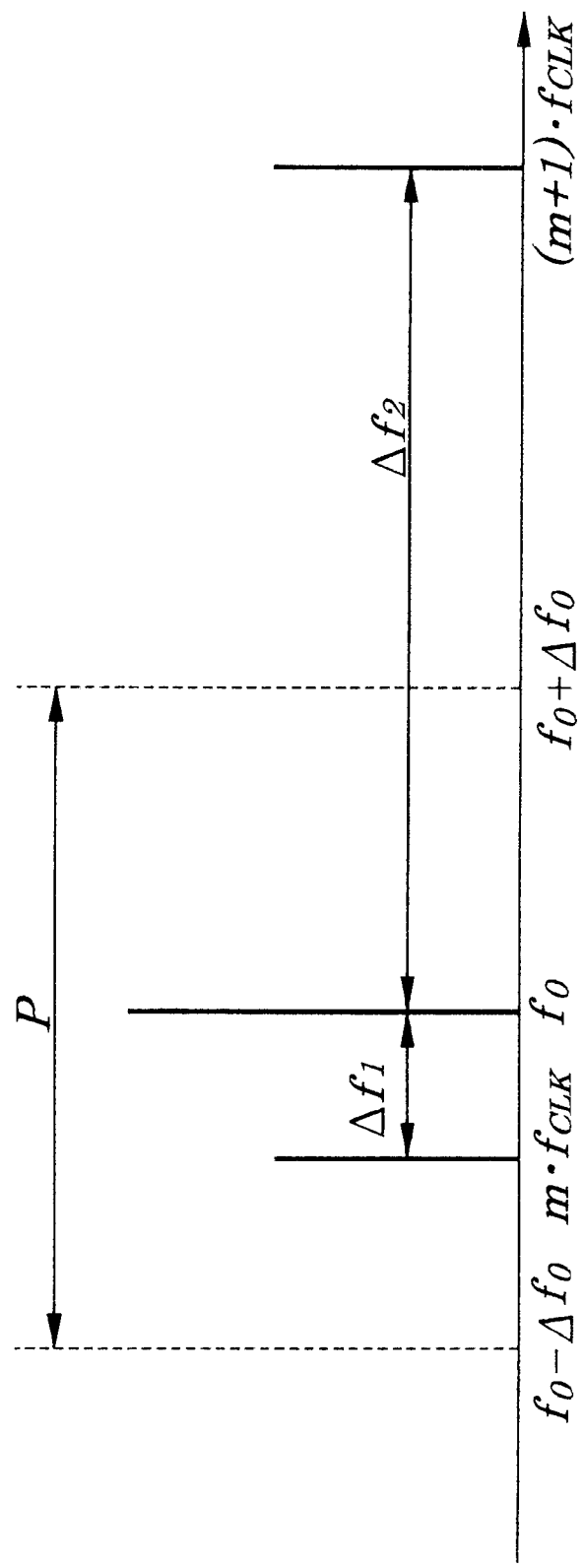
FIG. 3 is a view showing a relationship between a line signal frequency and a clock signal harmonic frequency producing receiving-desensitization in the wireless communication apparatus according to the first embodiment.
Figure 4:
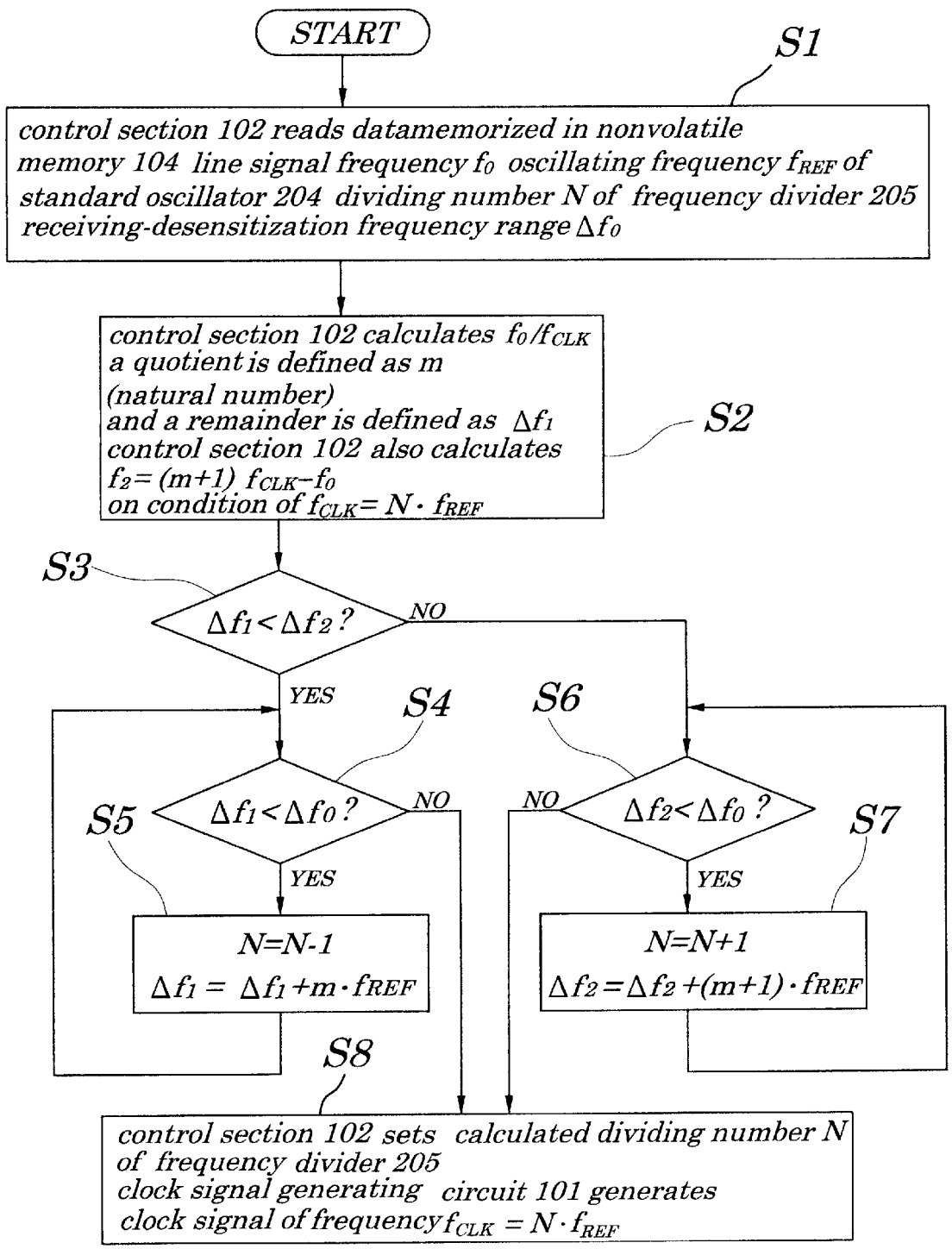
FIG. 4 is a flowchart showing a clock signal frequency control operation in the wireless communication apparatus according to the first embodiment.

FIG. 1 is a block diagram showing a wireless communication apparatus according to a first embodiment of this invention, FIG. 2 is a block diagram showing a clock signal generating circuit in this embodiment, FIG. 3 is a view showing a relationship between a line signal frequency and a clock signal harmonic frequency producing receiving-desensitization in the wireless communication apparatus according to this embodiment, and FIG. 4 is a flowchart showing a clock signal frequency control operation in the wireless communication apparatus according to the this embodiment.

The wireless communication apparatus of this embodiment, as shown in FIG. 1, is provided with a clock signal generating circuit 101, a control section 102, a receiver/demodulator 103 and a nonvolatile memory 104.

The clock signal generating circuit 101 generates a clock signal in accordance with control from the control section 102 and supplies the clock signal as an operating clock for the control section 102.

The control section 102 controls an operation of the receiver/demodulator 103 using data in the nonvolatile memory 104 and decodes a demodulated signal from the receiver/demodulator 103.

The receiver/demodulator 103 demodulates received wireless signal and outputs a demodulated signal being a digital signal.

The nonvolatile memory 104 memorizes data such as an ID address in the demodulated signal, a receiving line signal frequency in the receiver/demodulator 103.

Next, explanations will be given of the operation of the wireless communication apparatus.

A high frequency signal inputted through an antenna (not shown) and consisting of a wave modulated by a predetermined modulation mode is inputted into the receiver/demodulator 103.

At this time, the control section 102 controls the receiver/demodulator 103 so as to selectively receive the high frequency signal of a required line signal frequency in response to data of the receiving line signal frequency memorized in the nonvolatile memory 104. The receiver/demodulator 103 demodulates the received high frequency signal and then outputs the demodulated signal as the digital signal of a predetermined encoding form.

The control section 102 decodes this encoded signal using an operation clock signal from the clock signal generating circuit 101. The control section 102 outputs decoded result data onto a display (not shown) or a like when an ID address (such as a telephone number) in the decoded result data is checked with an ID address memorized in the nonvolatile memory 104 and these addresses are identical.

At this time, the control section 102 sets a frequency $f_0$ of a clock signal generated in the clock signal generating circuit 101 in response to a line signal frequency $f_0$ memorized in the nonvolatile memory 104, an oscillating frequency (standard frequency) $f_{REF}$ of a standard oscillator and a dividing number N of a frequency divider in the clock signal generating circuit 101, and data of frequency range $\Delta f_0$ in which desensitization occurs.

Additionally, since data rate of the digital signal as the decoded result data is exceedingly lower than the clock signal frequency, it is assumed that no influence is given to the decoding operation though clock signal frequency changes somewhat.

Next, detailed explanations will be given of a configuration and an operation of the clock signal generating circuit with reference to FIG. 2.

The clock signal generating circuit 101, as shown in FIG. 2, is provided with a VCO (Voltage Controlled Oscillator) 201, a LPF (Low Pass Filter) 202, a phase comparator 203, a standard oscillator 204 and a frequency divider 205.

The VCO 201 outputs a signal of a frequency changing in response to a polarity and a level of output voltage from the LPF 202 as a clock signal.

The LPF 202 restricts a band of an output signal from the phase comparator 203 and outputs a low frequency signal.

The phase comparator 203 compares a phase of an output signal from the frequency divider 205 with a phase of an output signal from the standard oscillator 204 and generates a phase error signal.

The standard oscillator 204 generates a stable signal of a predetermined frequency as a standard for clock signal generation.

The frequency divider 205 divides the clock signal frequency by a dividing number N (N is a natural number) set by the control signal from the control section 102.

The clock signal generating circuit 101 is a frequency synthesizer, is controlled as to the dividing number of the frequency divider 205 by a control signal from the control section 102 and supplies an operation clock signal from the VCO 201 for the control section 102.

In the clock signal generating circuit 101 shown in FIG. 2, when a dividing number of the frequency divider 205 is defined as N and an oscillating frequency of the standard oscillator 204 is defined as $f_{REF}$, a frequency $f_{CLK}$ of an output clock signal is expressed as follows:

$$F_{CLK} = N \cdot f_{REF} \quad (1).$$

FIG. 3 is a view showing a relationship between a line signal frequency and a clock signal harmonic frequency producing receiving-desensitization in the wireless communication apparatus according to the first embodiment.

Now, two clock signal harmonic near the line signal frequency $f_0$ are defined as $m \cdot f_{CLK}$ and $(m+1) \cdot f_{CLK}$ (m is a natural number) and the clock signal harmonic $m \cdot f_{CLK}$ exists at a downside of $\Delta f_1$ from the line signal frequency $f_0$ and the clock signal harmonic $(m+1) \cdot f_{CLK}$ is at an upside of $\Delta f_2$ from the line signal frequency $f_0$. In addition, it is assumed that receiving-desensitization occurs when a clock signal harmonic exists in a range P of $f_0 \pm \Delta f_0$ concerning the line signal frequency $f_0$.

Next, explanations will be given of the clock signal frequency control operation in the wireless communication apparatus of the first embodiment.

When power of the wireless communication apparatus is turned ON, the control section 102 reads data including the line signal frequency $f_0$, the oscillating frequency $f_{REF}$ of the standard oscillator 204, the dividing number N of the frequency divider 205 and the receiving-desensitization frequency range $\Delta f_0$ memorized in the nonvolatile memory 104 (step S1) (FIG. 4).

Then, the control section 102 calculates both—frequencies—ratio $f_0/f_{CLK}$ of both frequency in order to obtain a position of the clock signal harmonic $m \cdot f_{CLK}$ at the downside of line signal frequency $f_0$. In this case, a relationship, $f_{CLK} = N \cdot f_{REF}$, is carried out (step S2).

In this calculation, when a quotient of $f_0/f_{CLK}$ is defined as m and a remainder is defined as $\Delta f_1$, as shown in FIG. 3, a clock signal harmonic $m \cdot f_{CLK}$ exists at the downside for $\Delta f_1$ from the line signal frequency $f_0$.

The control section 102 also calculates $f_2 = (m+1) \cdot f_{CLK} - f_0$ in order to obtain a position of the clock signal harmonic $(m+1) \cdot f_{CLK}$ at the upside of line signal frequency $f_0$. As shown in FIG. 3, a clock signal harmonic $(m+1) \cdot f_{CLK}$ exists at the upside for $\Delta f_2$ from the line signal frequency $f_0$ (Step S2)

Then, the control section 102 compares $\Delta f2$ with $\Delta f1$ and then judges, which the clock signal harmonic frequency $m \cdot f_{CLK}$ or the clock signal harmonic frequency $(m+1) \cdot f_{CLK}$, exists near the line signal frequency $f_0$ (step S3)

When $\Delta f_1 < \Delta f_2$ is carried out, $\Delta f_0$ and $\Delta f_1$ are compared (step S4). When $\Delta f_1 < \Delta f_0$ is carried out, namely, the clock signal harmonic frequency $m \cdot f_{CLK}$ exists within the frequency range in which receiving desensitization occurs, the control section 102 subtracts 1 from the dividing number N, the clock signal frequency is defined as $f_{CLK} - f_{REF}$, and the clock signal harmonics frequency is lowered for $m \cdot f_{REF}$.

With this control, $\Delta f1$ increases by $m \cdot f_{REF}$ (step S5).

Furthermore, $\Delta f_0$ and $\Delta f_1$ are compared again (step S4), while $\Delta f_1 < \Delta f_0$ is carried out, processes in the step S4 and the step S5 are executed repeatedly. When $\Delta f_1 \geq \Delta f_0$ is carried out, the control section 102 calculates the dividing number N of the frequency divider 205 and sets the calculated dividing number N into the frequency divider 205.

At this time, the clock signal generating circuit 101 generates a clock signal of a frequency $f_{CLK} = N \cdot f_{REF}$ (step S8), therefore, the clock signal harmonic frequency exists outside of the frequency range $f_0 \pm \Delta f_0$ in which the receiving desensitization of the wireless communication apparatus occurs.

Further, in the step S3, when $\Delta f_1 \geq \Delta f_2$ is carried out, $\Delta f_0$ and $\Delta f_2$ are compared (step S6). When $\Delta f_2 < \Delta f_0$ is carried out, namely, the clock signal harmonics frequency $(m+1) \cdot f_{CLK}$ exists in the frequency range in which receiving desensitization occurs, the control section 102 adds 1 to the dividing number N, the clock signal frequency sets to $f_{CLK} + f_{REF}$, and the clock signal harmonics frequency is heightened for $(m+1) \cdot f_{REF}$. With this control, $\Delta f_2$ increases by $(m+1) \cdot f_{REF}$ (Step S7).

Furthermore, $\Delta f_2$ and $\Delta f_0$ are compared again (step S6), while $\Delta f_2 < \Delta f_0$ is carried out, processes in the step S6 and the step S7 are executed repeatedly. When $\Delta f_2 \geq \Delta f_0$ is carried out, the control section 102 calculates the dividing number of the frequency divider 205 and sets the calculated dividing number N into the frequency divider 205.

At this time, the clock signal generating circuit 101 generates a clock signal of a frequency $f_{CLK} = N \cdot f_{REF}$ (step S8), therefore, the clock signal harmonic frequency exists outside of the frequency range $f_0 \pm \Delta f_0$ in which the receiving desensitization of the wireless communication apparatus occurs.

As above described, according to the wireless communication apparatus in the first embodiment, since the control section 102 controls the clock signal frequency of the clock generating circuit so that the line signal frequency is not adjacent to the clock signal harmonic frequency, it is possible to prevent receiving-desensitization from occurring by influence of clock signal harmonic.

Second Embodiment

Figure 5:
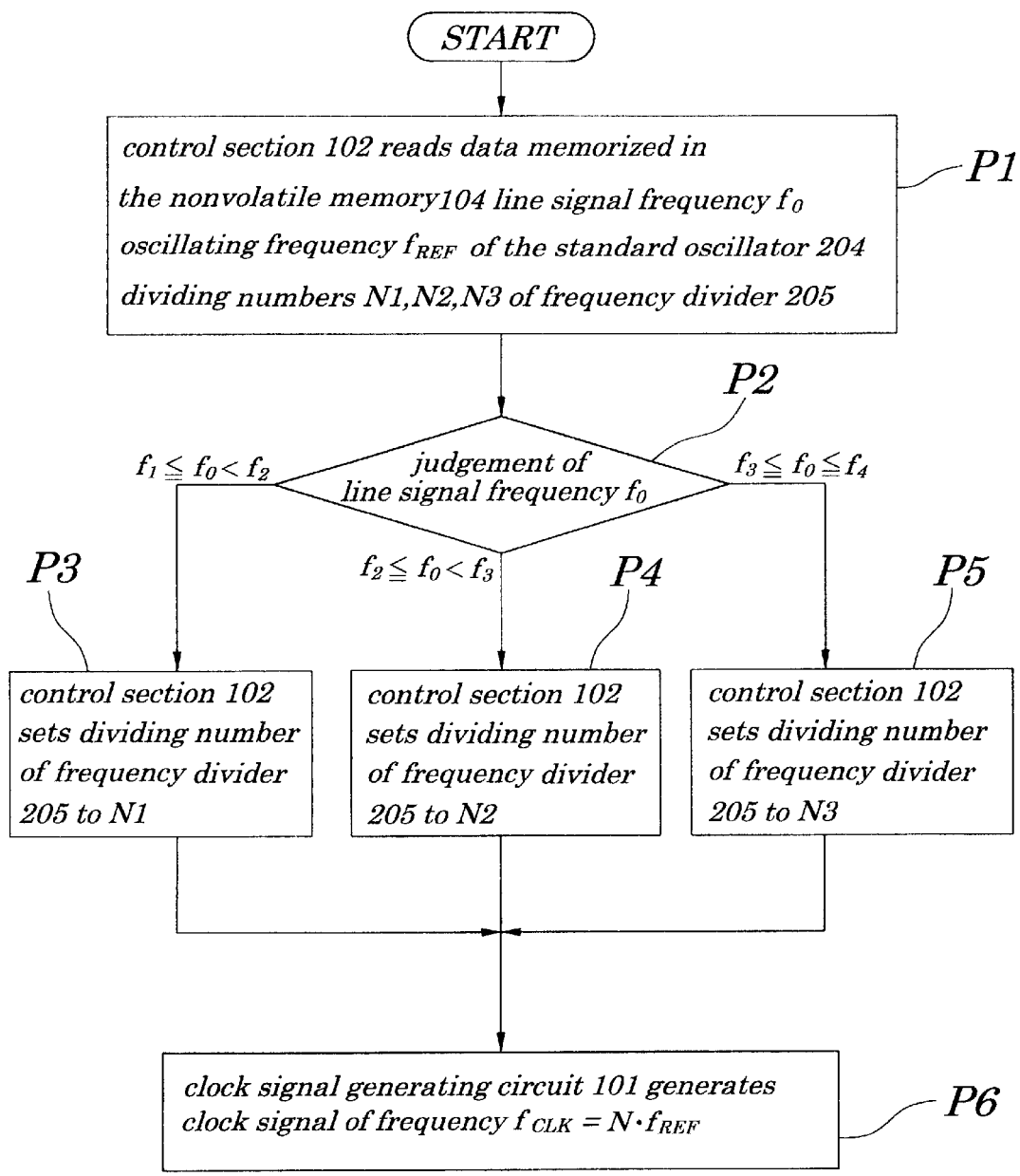
FIG. 5 is a flowchart showing a clock signal frequency control operation in a wireless communication apparatus according to a second embodiment of the present invention.
Figure 6:
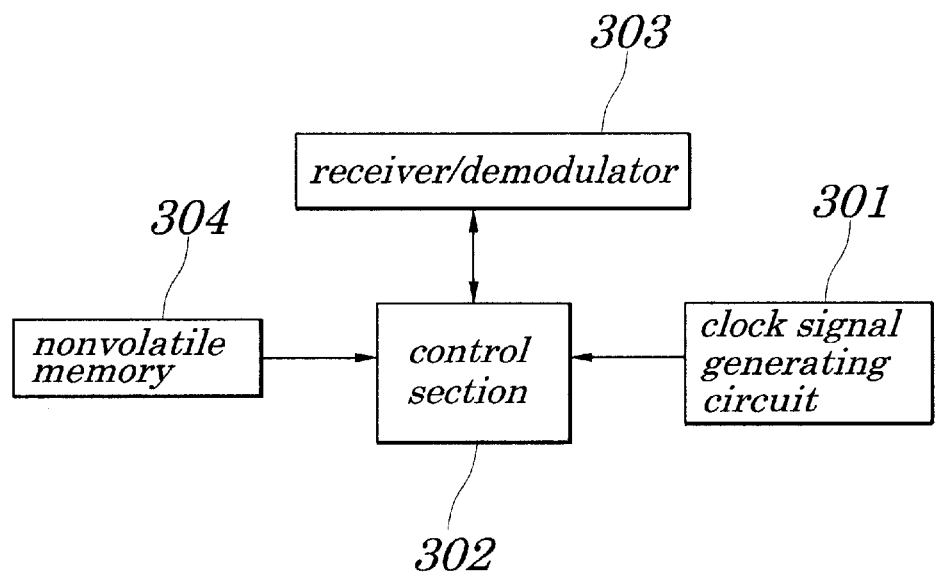
FIG. 6 is a block diagram showing a conventional wireless communication apparatus.
Figure 7:
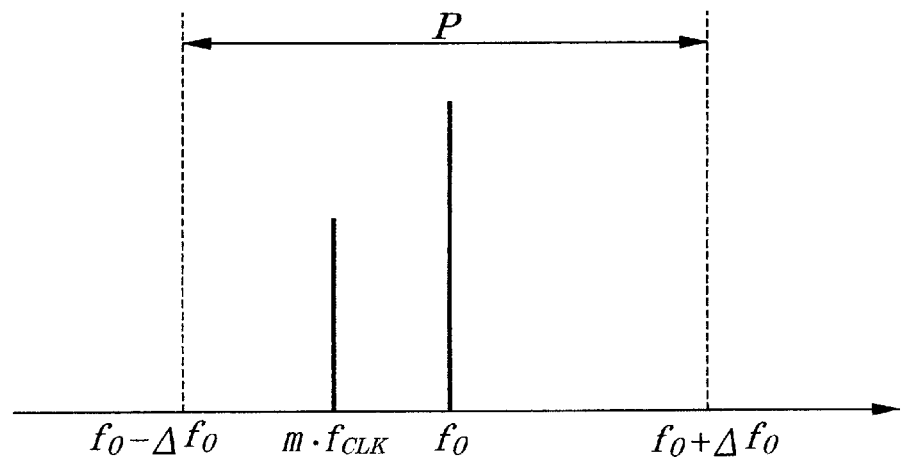
FIG. 7 is a view showing a relationship between a line signal frequency and a clock signal harmonic frequency in the conventional wireless communication apparatus.

FIG. 5 is a flowchart showing a clock signal frequency control operation in a wireless communication apparatus according to the second embodiment of the present invention.

In the second embodiment, a configuration of the wireless communication apparatus is similar to that in a first embodiment shown in FIG. 1, however, processes of the clock signal frequency control in a control section 102 differ from the first embodiment.

Thereunder, explanations will be given of a case in that a line signal frequency range capable being used in a wireless communication apparatus is within a range of from $f_1$ to $f_4$.

When power of the wireless communication apparatus is turned ON, the control section 102 reads data memorized in a nonvolatile memory 104 and including a line signal frequency $f_0$, an oscillating frequency $f_{REF}$ of a standard oscillator 204, dividing numbers N1, N2, N3 of a frequency divider 205 (step P1). Here, the dividing number N1 is defined as the dividing number in a case that the range of the line signal frequency. is $f_1 \leq f_0 < f_2$, the dividing number N2 is defined as the dividing number in the case that the range of the line signal frequency is $f_2 \leq f_0 < f_3$, and the dividing number N3 is defined as the dividing number in the case that the range of the line signal frequency is $f_3 \leq f_0 < f_4$.

Then, the control section 102 divides the range of the line signal frequency into three($f_1 \leq f_0 < f_2$, $f_2 \leq f_0 < f_3$, $f_3 \leq f_0 < f_4$) and judges in which range the line signal frequency $f_0$ exists (Step P2).

When the line signal frequency $f_0$ is $f_1 \leq f_0 < f_2$, the control section 102 sets the dividing number of the frequency divider 205 to N1 (Step P3). When the line signal frequency $f_0$ is $f_2 \leq f_0 < f_3$, the control section 102 sets the dividing number of the frequency divider 205 to N2 (Step P4). When the line signal frequency $f_0$ is $f_3 \leq f_0 < f_4$, the control section 102 sets the dividing number of the frequency divider 205 to N3 (Step P5).

Here, the dividing number N1 is set so that a clock signal harmonic of a frequency $f_{CLK} = N1 \cdot f_{REF}$ gives no influence to line signals of all frequencies in the range $f_1 \leq f0 < f_2$ and is memorized in the nonvolatile memory 104. Similarly, the dividing number N2 is set so that the clock signal harmonic of a frequency $f_{CLK} = N2 \cdot f_{REF}$ gives no influence toline signals of all frequencies in the range $f_2 \leq f0 < f_3$ and is memorized in the nonvolatile memory 104. Further, the dividing number N3 is set so that the clock signal harmonic of a frequency $f_{CLK} = N3 \cdot f_{REF}$ gives no influence to line signals of all frequencies in the range $f_3 \leq f0 < f_4$ and is memorized in the nonvolatile memory 104.

The clock signal generating circuit 101 uses one of the dividing numbers N1, N2, N3 decided in this way, and generates a clock signal of frequency $f_{CLK} = N \cdot f_{REF}$ using the decided dividing number. The control section 102 uses the clock signal as an operation clock signal and executes a predetermined operation such as decoding for a demodulation signal from a receiver/demodulator 103.

Accordingly, the wireless communication apparatus according to the second embodiment can prevent receiving-desensitization by influence of clock signal harmonic. Further, in the wireless communication apparatus according to the second embodiment, line signal frequencies are divided into three ranges as one example, however, line signal frequencies may be divided into any number of ranges if only no influence is given to line signals of all frequencies in a divided range by harmonics of clock signals used in the divided range.

The present invention is explained in detail with reference to drawings, however, a concrete configuration is not limited to these embodiments and the present invention includes changes and modifications of design without departing from the scope and spirit of the invention.

For example, in the first embodiment, instead of calculating so that dividing number N is changed by 1 and clock signal frequency is sequentially changed by standard frequency $f_{REF}$, a dividing number of a frequency divider for generating a clock signal frequency may be calculated so that harmonic frequencies of clock signals are not within the range $\Delta f_0$ in which receiving-desensitization occurs in a receiver/demodulator in accordance with a line signal frequency, and a clock signal may be generated using this dividing number.

Furthermore, in this modification and the first embodiment, when a required dividing number of a frequency divider is decided by calculation, the dividing number as a calculation result may be memorized in a memory so as to correspond with a line signal frequency. Next time, when an identical line signal frequency is received, the dividing number memorized in the memory may be read out and used without calculating the dividing number every time.

Furthermore, the present invention is not limited to a wireless selective calling receiver and may be applied to a portable phone, various personal digital assistants in which a receiver/demodulator is built, or a like.

As above explained, according to the configuration of the present invention, a clock generating circuit sets a clock signal frequency so that a harmonic frequency of an operation clock signal in the control section is not adjacent to a line signal frequency and does not exist in a frequency range in which receiving-desensitization occurs in the receiver/demodulator, therefore, it is possible to prevent a receiving-sensitivity from deteriorating by influence of clock signal harmonic.

It is thus apparent that the present invention is not limited to the above embodiments but may be changed and modified without departing from the scope and spirit of the invention.

Finally, the present application claims the priority based on Japanese Patent Application No. Hei11-195861 filed on Jul. 9,1999, which is herein incorporated by reference.

What is claimed is:

1. A wireless communication apparatus comprising:

a receiver for receiving a line signal of a designated frequency, a demodulator for demodulating said line signal, a control section for decoding said demodulated line signal with a clock signal, and a clock signal generating circuit for supplying said clock signal for said control section, and;

wherein said control section controls said clock signal generating circuit in response to a line signal frequency to change a frequency of said clock signal so that a harmonic of the clock signal does not exist in a desensitization range corresponding to said line signal frequency.

2. The wireless communication apparatus according to claim 1, wherein said clock signal generating circuit comprises a standard oscillator generating a signal of a standard frequency, a divider for dividing said clock signal, a phase comparator for detecting a phase error between said divided clock signal and said standard frequency signal and a VCO (Voltage Controlled Oscillator) for changing an oscillating frequency in response to said phase error and wherein said frequency of said clock signal outputted from said VCO is changed by changing a dividing number of said divider in accordance with control by said control section.

3. The wireless communication apparatus according to claim 2, wherein said control section sequentially changes said dividing number of said divider and controls said clock signal generating circuit to generate said clock signal while calculating whether a clock signal harmonic frequency exists in said desensitization range corresponding to said line signal frequency in accordance with said line signal frequency, so that said clock signal harmonic frequency does not exist in said desensitization range corresponding to said line signal frequency.

4. The wireless communication apparatus according to claim 3, wherein said control section determines whether said clock signal harmonic frequency is close to an upside or a downside of said desensitization range, and then controls said clock signal harmonic frequency to exist in a closer range outside of said desensitization range.

5. The wireless communication apparatus according to claim 2, wherein said control section calculates said dividing number of said divider necessary so that said clock signal harmonic frequency does not exist in said desensitization corresponding to said line signal frequency in response to said line signal frequency.

6. The wireless communication apparatus according to one of claim 3, claim 4 or claim 5, further comprising a memory for memorizing said calculated dividing number so as to correspond with said line signal frequency, and wherein said control section controls said clock signal generating means to generate said clock signal using said memorized dividing number when an identical line signal frequency is received.

7. The wireless communication apparatus according to claim 2, further comprising:

a memory for previously memorizing dividing-rate-data of said dividing means for each division among plural divisions obtained by dividing a receiving-frequency-range, said dividing-rate-data determined so that a clock signal harmonic frequency does not exist in a desensitization range corresponding to all line signal frequencies in said each division, and wherein said control section reads said dividing-rate-data corresponding to a received-line-signal-frequency, controls a dividing-rate of said divider in accordance with said dividing-rate-data and controls said clock generating circuit to generate said clock signal.

8. A wireless communication method comprising:

a step of receiving a line signal of a designated frequency;

a step of demodulating said line signal;

a step of changing a frequency of a clock signal in response to a line signal frequency so that a harmonic of the clock signal does not exist in a desensitization range corresponding to said line signal frequency;

a step of generating said clock signal; and a step of decoding said demodulated line signal with said clock signal.

9. A media storing a program, said program comprising:

a step of receiving a line signal of a designated frequency;

a step of demodulating said line signal;

a step of changing a frequency of a clock signal in response to a line signal frequency so that a harmonic of the clock signal does not exist in a desensitization range corresponding to said line signal frequency;

a step of generating said clock signal; and a step of decoding said demodulated line signal with said clock signal.

* * * * *

UNITED STATES PATENT AND TRADEMARK OFFICE
CERTIFICATE OF CORRECTION

PATENT NO. : 6,735,428 B1
DATED : May 11, 2004
INVENTOR(S) : Naoki Tsukuda

It is certified that error appears in the above-identified patent and that said Letters Patent is hereby corrected as shown below:

Column 8,
Line 34, "toline" has been replaced with -- to line --.

Signed and Sealed this

Seventeenth Day of August, 2004

JON W. DUDAS
*Acting Director of the United States Patent and Trademark Office*